United States Patent [19]
van Kesteren

[11] Patent Number: 5,979,179
[45] Date of Patent: Nov. 9, 1999

[54] DEVICE AND METHOD FOR PURIFYING A GAS OR VAPOR FLOW

[76] Inventor: Heinrich J van Kesteren, Vaart 21, Brielle, NL-3232, Netherlands

[21] Appl. No.: 08/973,895

[22] PCT Filed: Jun. 17, 1996

[86] PCT No.: PCT/NL96/00248

§ 371 Date: Jun. 5, 1998

§ 102(e) Date: Jun. 5, 1998

[87] PCT Pub. No.: WO97/00117

PCT Pub. Date: Jan. 3, 1997

[30] Foreign Application Priority Data

Jun. 15, 1995 [NL] Netherlands ............................ 1000578

[51] Int. Cl.$^6$ ........................................................ F25J 1/00
[52] U.S. Cl. ................................................ 62/632; 62/637
[58] Field of Search ........................................ 62/632, 637

[56] References Cited

U.S. PATENT DOCUMENTS

| | | | |
|---|---|---|---|
| 4,169,133 | 9/1979 | Staege | 62/637 |
| 4,424,680 | 1/1984 | Rothchilo | 62/632 |
| 4,599,462 | 7/1986 | Michl | 62/637 |
| 4,755,201 | 7/1988 | Eschey et al. | 62/637 |
| 5,540,057 | 7/1996 | Cheng | 62/632 |

FOREIGN PATENT DOCUMENTS

| | | |
|---|---|---|
| 2322148 | 11/1974 | Germany . |
| 2740341 | 3/1978 | Germany . |
| 2902391 | 7/1980 | Germany . |
| 3420899 | 12/1985 | Germany . |
| 4001710 | 7/1991 | Germany . |

*Primary Examiner*—Ronald Capossela
*Attorney, Agent, or Firm*—Jones, Day, Reavis & Pogue

[57] ABSTRACT

A method and a device for removing from a gas or vapor flow at least part of an ecologically unsound substance present therein, such as benzene, perchloroethylene or other hydrocarbons and/or solvents, includes passing the gas or vapor flow through a cooling room having a temperature which is at least substantially equal to or lower than the condensation temperature of the ecologically unsound substance, wherein a medium having a solidification temperature which is at least substantially equal to or higher than the temperature of the cooing room is introduced into the gas or vapor flow prior to and/or during the entry of said flow into the cooling room, and wherein the temperature in the cooling room is raised after a predetermined period and the gas or vapor flow is interrupted or diverted in order to liquify and discharge the solidified medium and the ecologically unsound substance contained therein.

14 Claims, 1 Drawing Sheet

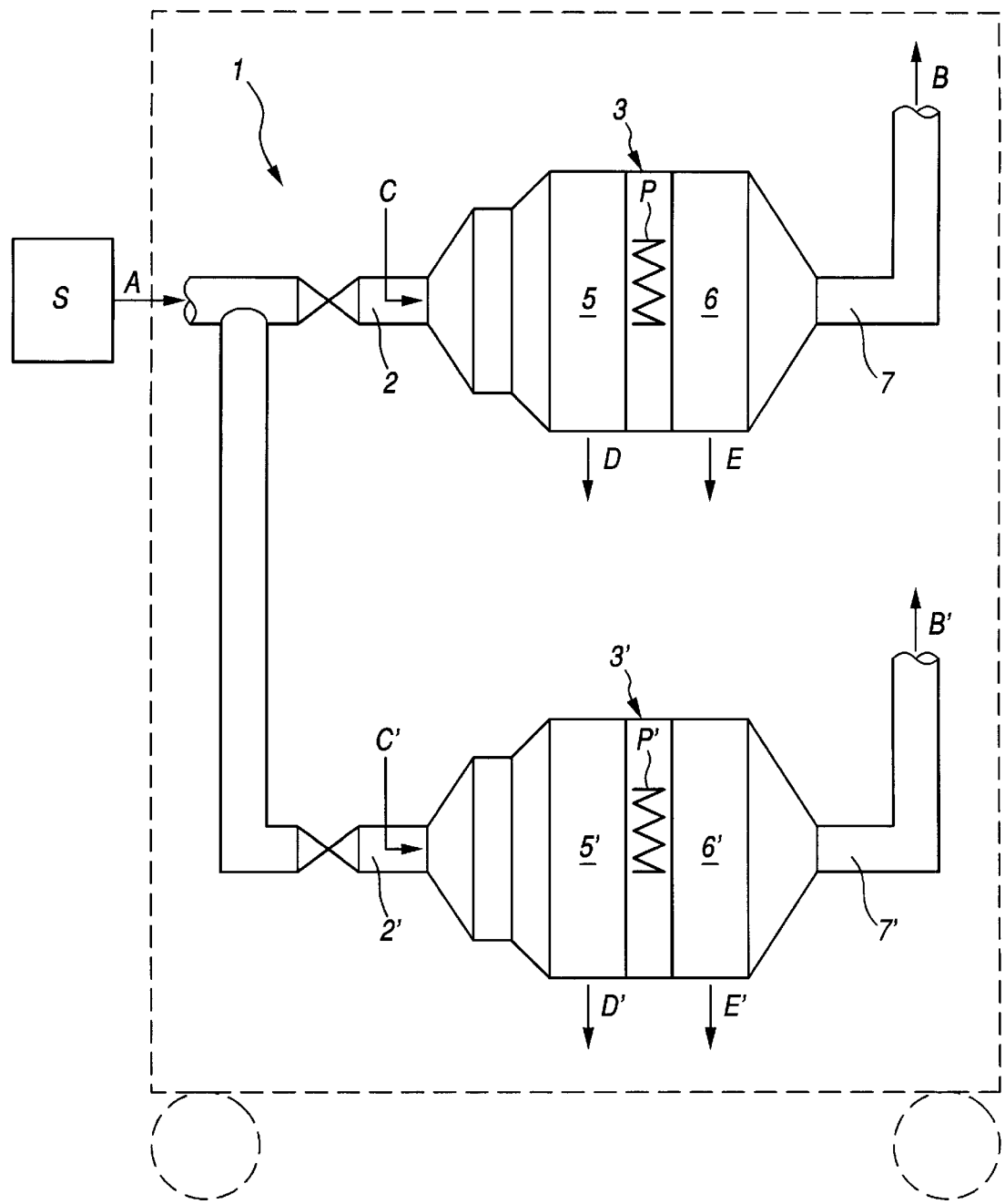

DEVICE AND METHOD FOR PURIFYING A GAS OR VAPOR FLOW

BACKGROUND OF THE INVENTION

In the (petro)chemical industry as well as during the transport of ecologically unsound substances and at petrol pumps and the like, undesirable vapours or gases may be released. The release of ecologically unsound substances is bound by increasingly stringent environmental regulations. In most cases the admissible concentration of such substances is expressed in p.p.m. (parts per million) or gramme per $m^3$, whereby the admissible concentration has constantly been reduced over the years.

Furthermore solvents and hydrocarbon represent a relatively high value, which can be retained upon recovery and reuse.

The first known method for recovering solvents and/or hydrocarbons utilize filters, which are mostly provided with active carbon—see for example U.S. Pat. No. 4,583,985, U.S. Pat. No. 3,199,679 and U.S. Pat. No. 2,656,696, whereby certain ecologically unsound substances are adsorbed by the filter material.

Filtering and adsorption units of this type require constant maintenance and attention from operating staff and need to be cleaned at regular intervals. Furthermore such units are liable to wear and must be replaced after some time. Regeneration of the adsorption units usually entails the additional necessity of purifying a water flow. Finally it is by no means certain that the present and future stringent environmental regulations can be met by using filtering units of this type.

Furthermore processes are known wherein use is made of solvents, such as liquid carbon dioxide or chlorofluorocarbons (CFC's), the use of the latter being forbidden at the moment.

Examples of this can be found in U.S. Pat. Nos. 3,664,806 and 3,807,948.

Furthermore a purification system is known for for example benzene, which has a solidification point of 6° C., whereby a gas flow containing benzene is passed through a room cooled to a temperature of −80° C. in order for the benzene to deposit on the walls of a cooling element in the form of a solid substance and/or a liquid, and, after the temperature has been raised and the gas flow has been diverted to a second cooled room—or after a temporary interruption of the gas flow—the benzene can be discharged in liquid form. With this existing unit a pre-cooling unit is commonly used for removing water or water vapour from the gas flow. A process for the removal of condensible compounds from a gas flow is disclosed, for example, in DE-A-4001710.

SUMMARY OF THE INVENTION

The present invention provides a method for removing from a gas or vapour flow at least part of an ecologically unsound substance present therein, such as benzene, perchloroethylene or other hydrocarbons and/or solvents, wherein said gas or vapour flow is passed through a cooling room having a temperature which is equal to or lower than the condensation temperature of the ecologically unsound substance, wherein a medium having a solidification temperature which is equal to or higher than the temperature of the cooling room is introduced into the gas or vapour flow prior to the entry of said flow into the cooling room, and wherein the temperature in the cooling room is raised after a predetermined period and the gas or vapour flow is interrupted or diverted so that the gas or vapour flow does not enter the cooling room, in order to liquefy and discharge the solidified medium and the ecologically unsound substance contained therein. The ecologically unsound substance, in particular benzene, deposits in the form of solid matter and/or a liquid (condensation) on walls of preferably spiral cooling elements in the cooling room. The benzene is thereby intercepted ("encapsulated") by the medium, which is depositing on the cooling elements in the form of solid matter. Said encapsulation furthermore makes it impossible for the benzene to evaporate and thus find its way into the gas or vapour flow as yet. By raising the cooling room temperature the solidified medium and the benzene encapsulated therein are liquefied and subsequently discharged, after which further processing of the medium and the benzene can take place separately. Preferably the medium does not mix and/or react with the ecologically unsound substance, so that said substance can be readily recovered.

In a preferred embodiment of a method according to the invention the discharged medium is at least partly reused and introduced into the gas or vapour flow again. Thus an efficient closed system is obtained, whereby it is prevented that the medium itself, which may be contaminated by the ecologically unsound substance(s), must be purified after every cycle.

In another embodiment of a method according to the invention the medium is injected into the gas or vapour flow. More in particular the medium is thereby dispersed very finely in the gas or vapour flow, preferably in the form of a mist or steam, in order to enhance the above-explained effect of the medium.

In another embodiment of a method according to the invention the selected medium is water. The advantage of water is that it is inexpensive, whilst in addition to that it does not mix/react with ecologically unsound substances, such as benzene and the like, which are present in the gas or vapour flow. In this connection water behaves as an "inert" substance, therefore, which makes it readily possible to subject the recovered benzene (for example) to further separate processing. Another important advantage of water is that in solidified form (that is, when frozen) it possesses a rough and consequently enlarged surface, which results in an ideal interception or encapsulation of the ecologically unsound substance. The water is preferably introduced/injected into the gas or vapour flow in the form of a mist or as steam (vapour).

In another preferred embodiment of a method according to the invention the cooling room temperature ranges from—10° C. to −70° C., preferably from −20° C. to −40° C., and more particularly is at least substantially −30° C. Extensive research has surprisingly shown that, in particular depending on the flow rate of the gas or vapour flow, temperatures such as the above are to be preferred from an energetic point of view and from the point of view of an improved recovery percentage of the ecologically unsound substance.

In another preferred embodiment of a method according to the invention the gas or vapour flow comes from the hold of a ship, such as a tanker for the transport of ecologically unsound substances or substances which contain ecologically unsound substances, such as benzene, toluene and/or cumene and the like. In another preferred embodiment the gas or vapour flow comes from a tank lorry, whilst in another preferred embodiment the gas or vapour flow comes from a petrol pump or storage facility for ecologically unsound substances.

The present invention furthermore provides a device for removing an ecologically unsound substance, in particular benzene, perchloroethylene or other hydrocarbons and/or solvents from a gas or vapour flow, said device comprising:

an inlet for the supply of said gas or vapour flow;

a cooling room provided with cooling means for cooling said ecologically unsound substance down to a temperature which is equal to or lower than the condensation temperature of the ecologically unsound substance;

means for introducing into the gas or vapour flow, prior to the entry of said flow into the cooling room, a medium having a solidification temperature which is equal to or higher than the cooling room temperature;

a gas outlet for discharging said at least partially purified gas or vapour flow from said cooling room; and discharge means for discharging said ecologically unsound substance from the cooling room after the gas or vapour flow has been interrupted or diverted so that the gas or vapour flow does not enter the cooling room.

As will be explained in more detail in the description of the Figures, a single system is used when the gas or vapour flow is interrupted, whilst a double system is used when the gas or vapour flow is diverted. More in particular the device is in the form of a mobile unit, so that it can be readily moved from ship to ship or from tank lorry to tank lorry, etc.

Unlike the existing processes, which use temperatures of about −80° C., the process according to the present invention uses temperatures which are not so low, thus requiring less energy, whilst it is furthermore preferred to add water to the process instead of removing water vapour, since frozen water functions as an adsorption means for ecologically unsound substances, and the water functions to encapsulate the condensed vapour of the ecologically unsound substances. First experiments have shown that in comparison with the existing processes, which use a low temperature, a reduction in the order of 50–80% can be achieved, whilst the temperatures used need not be so low.

An additional advantage that may be mentioned is the fact that the present invention requires only minor modifications to the existing equipment used for purifying gas flows at low temperatures.

BRIEF DESCRIPTION OF THE DRAWING

Further advantages, aspects and details of the present invention will be explained in the following description of the preferred embodiment thereof, wherein reference is made to the accompanying FIGURE.

DETAILED DESCRIPTION OF THE PREFERRED EMBODIMENT

A device 1 according to the present invention comprises a supply pipe 2, through which a gas or vapour flow is carried to a cooling room 3, as indicated by arrow A. A source S for the gas or vapour flow may be the hold of a ship, a tank lorry, a petrol pump or storage facility for ecologically unsound substances. The cooling room 3 is provided with a first cooling element in a schematically indicated part 5 and with a second cooling element 6 in a second schematically indicated part 6, whereby a coolant is passed through both cooling elements for cooling said cooling room 3 to a temperature of about −30° C. A discharge pipe 7 is provided at the outlet side of cooling room 3, which pipe functions to discharge the purified gas flow, for example into the atmosphere, as is schematically indicated by arrow B. An injection pipe for injecting water or water vapour, for example into supply pipe 2, as is diagrammatically indicated by arrow C, is provided near the inlet side of cooling room 3. Parts 5 and 6 are furthermore provided with discharge pipes, which are schematically indicated by arrows D and E, for discharging the mixture of water and the ecologically unsound substances to be removed, which mixture has deposited on the spiral pipes P in the form of ice and solid matter to be removed.

The method for purifying the gas flow 1 proceeds as follows: water is constantly injected into the gas flow, as indicated by arrow C, and icing up takes place both in part 5 and in part 6 of cooling room 3, whereby it is assumed that said icing up takes place to a larger extent in part 5. Said ice functions as an adsorbent for the undesirable substances to be removed, or it encapsulates said undesirable substances. After some time room 3 will be clogged by the solid matter precipitated between the pipes of the cooling element, after which the gas flow will be interrupted or diverted, the cooling process in parts 5 and 6 will be interrupted and the mixture of water and the ecologically unsound liquid can be discharged via arrows D and E, the ecologically unsound substances may be recovered, whilst the water may be reused for injection. The FIGURE shows that a second cooling room 3' is disposed parallel to cooling room 3, which cooling room 3' is constructed in the same manner as cooling room 3, with like parts and designations being provided with an accent.

First experiments have been carried out while a ship was being loaded with benzene, the previous cargo of said ship being cumene. Said loading lasted 9.5 hours, whereby water was injected into the gas flow coming from the hold of the ship for 2 hours. An existing BVRU (Benzene Vapour Recovery Unit) was used, which normally uses a temperature of −80° C. and which utilizes a pre-cooling unit.

During this experiment the pre-cooling unit was not turned off, but in spite of that the benzene concentration appeared to have decreased from 100 ppm to 7 ppm after ¾ hour, due to the growth of ice and ecologically unsound substances on the cooling element in part 5. At a later stage a decrease in the concentration of benzene in the discharged gas flow from 30 ppm to 9 ppm was observed, due to the growth of ice and ecologically unsound substances on the cooling element in part 6. The results will be even better when the pre-cooling unit is not used, since said pre-cooling unit causes part of the injected water to precipitate, whilst it is furthermore not possible to utilize the moisture already present in the gas flow.

The invention is not limited to the above-described embodiment, which merely serves as an example. The device may also be constructed as a mobil unit, as indicated by the broken lines in the drawing.

I claim:

1. A method for removing from a gas or vapour flow at least part of an ecologically unsound substance, particularly benzene, perchloroethylene or other hydrocarbons and/or solvents, the method comprising the steps of:

providing a cooling room having a temperature which is equal to or lower than the condensation temperature of the ecologically unsound substance;

introducing into the gas or vapour flow a medium having a solidification temperature which is equal to or higher than the temperature of the cooling room;

passing the medium and gas or vapour flow through the cooling room;

raising the temperature in the cooling room after a predetermined time; and interrupting or diverting the gas or vapour flow in order to liquify and discharge solidified medium and an ecologically unsound substance contained therein.

2. A method according to claim 1, wherein the discharged medium is at least partly reused and introduced into the gas or vapour flow again.

3. A method according to claim 1, wherein said medium is injected into said gas or vapour flow prior to cooling.

4. A method according to claim 1, wherein said medium contains water.

5. A method according claim 1, wherein the cooling room temperature ranges from −10° C. to −70° C., preferably from −20° C. to −40° C., and more particularly is at least substantially 30° C.

6. A method according to claim 1, wherein said gas or vapour flow comes from the hold of a ship, such as a tanker for the transport of ecologically unsound substances or substances which contain ecologically unsound substances, such as benzene, toluene and/or cumene and the like.

7. A method according to claim 1, wherein said gas or vapour flow comes from a tank lorry.

8. A method according to claim 1, wherein said gas or vapour flow comes from a petrol pump.

9. A method according to claim 1, wherein said gas or vapour flow comes from a storage facility for ecologically unsound substances or substances which contain ecologically unsound substances.

10. A device for removing an ecologically unsound substance, particularly benzene, perchloroethylene or other hydrocarbons and/or solvents from a gas or vapour flow, said device comprising:

an inlet for the supply of said gas or vapour flow;

a cooling room provided with cooling means for cooling said ecologically unsound substance down to a temperature which is equal to or lower than the condensation temperature of the ecologically unsound substance;

means for introducing into the gas or vapour flow, prior to the entry of said flow into the cooling room a medium having a solidification temperature which is equal to or higher than the cooling room temperature;

a gas outlet for discharging said at least partially purified gas or vapour flow from said cooling room; and discharge means for discharging said ecologically unsound substance from the cooling room after the gas or vapour flow has been interrupted or diverted so that the gas or vapour flow does not enter the cooling room.

11. A device according to claim 10, wherein said cooling means are capable of cooling said room to a temperature ranging from −10° C. to −70° C., preferably from −20° C. to −40° C., and more particularly to a temperature of at least substantially −30° C.

12. A device according to claim 10, wherein said cooling means include a first spiral cooling pipe configured as a cooling element with coolant passing therethrough.

13. A device according to claim 12, wherein said cooling means comprise a second spiral cooling pipe configured as a cooling element with coolant passing therethrough.

14. A device according to claim 10, wherein said device is a mobile unit.

* * * * *